United States Patent
Svensson et al.

(10) Patent No.: US 8,221,020 B2
(45) Date of Patent: Jul. 17, 2012

(54) THROUGH PIN ASSEMBLY FOR AN AXLE AND METHOD OF MOUNTING

(75) Inventors: Roger Svensson, Sedona, AZ (US); Anders Carlsson, Åtvidaberg (SE); Everth Svensson, Åtvidaberg (SE)

(73) Assignee: Svenska Expander AB, Atvidaberg (SE)

( * ) Notice: Subject to any disclaimer, the term of this patent is extended or adjusted under 35 U.S.C. 154(b) by 408 days.

(21) Appl. No.: 12/061,992

(22) Filed: Apr. 3, 2008

(65) Prior Publication Data
US 2009/0250581 A1    Oct. 8, 2009

(51) Int. Cl.
F16C 11/06    (2006.01)
(52) U.S. Cl. .......................... 403/157; 403/156; 403/370
(58) Field of Classification Search .................. 403/79, 403/150, 154, 156, 157, 370, 371; 280/93.512
See application file for complete search history.

(56) References Cited

U.S. PATENT DOCUMENTS

| | | | |
|---|---|---|---|
| 389,480 A * | 9/1888 | Massett | 403/370 |
| 1,472,565 A * | 10/1923 | Manning | 403/370 |
| 3,129,966 A * | 4/1964 | Blank | 403/156 |
| 4,634,299 A * | 1/1987 | Svensson | 403/371 |
| 5,209,594 A * | 5/1993 | Svensson et al. | 403/156 |
| 5,551,794 A * | 9/1996 | Aarre et al. | 403/371 |

* cited by examiner

*Primary Examiner* — Michael P Ferguson
(74) *Attorney, Agent, or Firm* — Weiss & Moy, P.C.; Jeffrey D. Moy

(57) ABSTRACT

A through pin assembly for securing an axle into a pair of mounting cheeks and to stabilize a machine member is disclosed. The pin assembly has an axle having a pair of end members formed on each end of the axle. A channel is formed through the axle and runs a length of the axle. The channel consists of a threaded area of the channel at the first end for use when removing the assembly; a hexagon, octagon or otherwise shaped area at the second end to interlock with the threaded part of the locking end member; two grooves in the channel, one at each end, as a seat for gaskets to seal off a grease or oil chamber for distribution to the bearing. A bearing is mounted on a central section of the axle. A pair of expansion sleeves is provided wherein one of the pair of expansion sleeves is positioned over each of the end member of the axle. A locking device is inserted into the channel. The locking device engages the pair of expansion sleeves causing the expansion sleeves to expand into a pair of mounting cheeks and stabilizing the machine member to secure the axle when a first end of the locking device is adjusted.

9 Claims, 3 Drawing Sheets

THROUGH PIN ASSEMBLY FOR AN AXLE AND METHOD OF MOUNTING

FIELD OF THE INVENTION

This invention relates generally to an arrangement for locking a shaft into a pair of mounting cheeks and stabilizing a machine member, and, more specifically, to an arrangement for locking a shaft or an axle into a pair of mounting cheeks and stabilizing a machine member where only one end of the shaft need be accessible in order to clamp or lock the shaft into a pair of mounting cheeks and to stabilize the machine member.

BACKGROUND OF THE INVENTION

The conventional way to achieve pivotability in a connection between two machine parts is to use a hinge journalled in bearings, comprising one or more bearings arranged on a shaft/axle (hereinafter axle) which is fixed in between a pair of mounting cheeks or the like on one of the machine parts. The inner race of the bearing or bearings is disposed on the axle and, possibly with the aid of distancing rings, bridges the distance between the fixing cheeks, while the outer race of the bearing or bearings is effectively connected to the second machine part. Since relative movement between the inner bearing race and the axle produces progressively increasing wear resulting in excessive play and perhaps fracture of the axle, the race has to be fixed relative to the axle by means of nuts screwed onto each of the respective axle ends. It is important that the nuts are tightened just the right amount, since excessive tightening may jeopardize the attachment of the mounting cheeks, and excessive play may arise as a result of insufficient tightening, with the results mentioned above One drawback with the above locking arrangement is that locking is effected through the medium of two nuts mounted on respective ends of the axle. When the axle is located in a confined space, it is difficult to reach the nuts on both ends of the axle in order to tighten the same.

Therefore, a need existed to provide a system and method to overcome the above problem. The system and method would provide an improved arrangement for locking an axle into a pair of mounting cheeks and stabilizing a machine member where solely one end of the axle need be accessible in order to clamp or lock the axle into a pair of mounting cheeks and stabilize the machine member

SUMMARY OF THE INVENTION

A through pin assembly for securing an axle into a pair of mounting cheeks and to stabilize a machine member is disclosed. The through pin assembly for securing an axle to a pair of mounting lugs and stabilizing a machine member has an axle having a first end and a second end. A channel is formed through the axle and runs a length of the axle. The axle has a groove formed in each end of the channel as a seat for a gasket to seal off a lubrication chamber for distribution to the bearing. A bearing is mounted on a central section of the axle. A pair of expansion sleeves is provided wherein one of the pair of expansion sleeves is positioned over each of the first end and second end of the axle. A locking device is inserted into the channel and engaged with a locking end member. The locking device engages the pair of expansion sleeves causing the expansion sleeves to expand into the mounting cheeks to secure the axle when a first end of the locking device is adjusted.

A method of installing a through pin assembly for securing an axle into a pair of mounting cheeks and stabilizing a machine member is disclosed. The method of installing a through pin assembly for securing an axle into a pair of mounting cheeks and stabilizing a machine member comprising: providing a through pin assembly comprising: an axle having a first end and a second end, a channel formed through the axle and running a length of the axle and having a groove formed at each end of the channel as a seat for a seal device to seal a chamber for distribution of a lubricant to the bearing; a bearing mounted on a central section of the axle; a pair of expansion sleeves, wherein one of the pair of expansion sleeves is positioned over each of the first end and second end of the axle; and a locking device inserted into the channel, the locking device engaging the pair of expansion sleeves causing the expansion sleeves to expand into the mounting cheeks and securing the axle when a first end of the locking device is adjusted wherein the locking device comprises: a through pin having at least one of a first end and second end that is threaded; a tension device threaded on the first end of the pin and engages the expansion sleeve on the first end of the axle; a tension washer member having an opening formed through a central area thereof through which the through pin is inserted, the tension washer member engaging the tension device and the expansion sleeve on the first end of the axle; and a locking end member which is threaded on the second end of the through pin and engages the expansion sleeve on the second end of the axle; securing the locking end member to the second end of the pin; fitting one of the pair of expansion sleeves onto the second end of the axle; inserting the pin into the channel formed in the axle; fitting one of the pair of expansion sleeves onto a first end of the axle; fitting the tension washer member onto the first end of the pin; and securing the tensioning device onto the first end of the pin and abutted with the tension washer member, wherein tightening the tensioning device causes the tension washer member and the locking end member to engage the expansion sleeves causing the expansion sleeves to expand and be pressed into a pair of mounting cheeks and securing the machine member.

The present invention is best understood by reference to the following detailed description when read in conjunction with the accompanying drawings.

BRIEF DESCRIPTION OF THE DRAWINGS

Common reference numerals are used throughout the drawings and detailed descriptions to indicate like elements.

DETAILED DESCRIPTION

Figure 1:
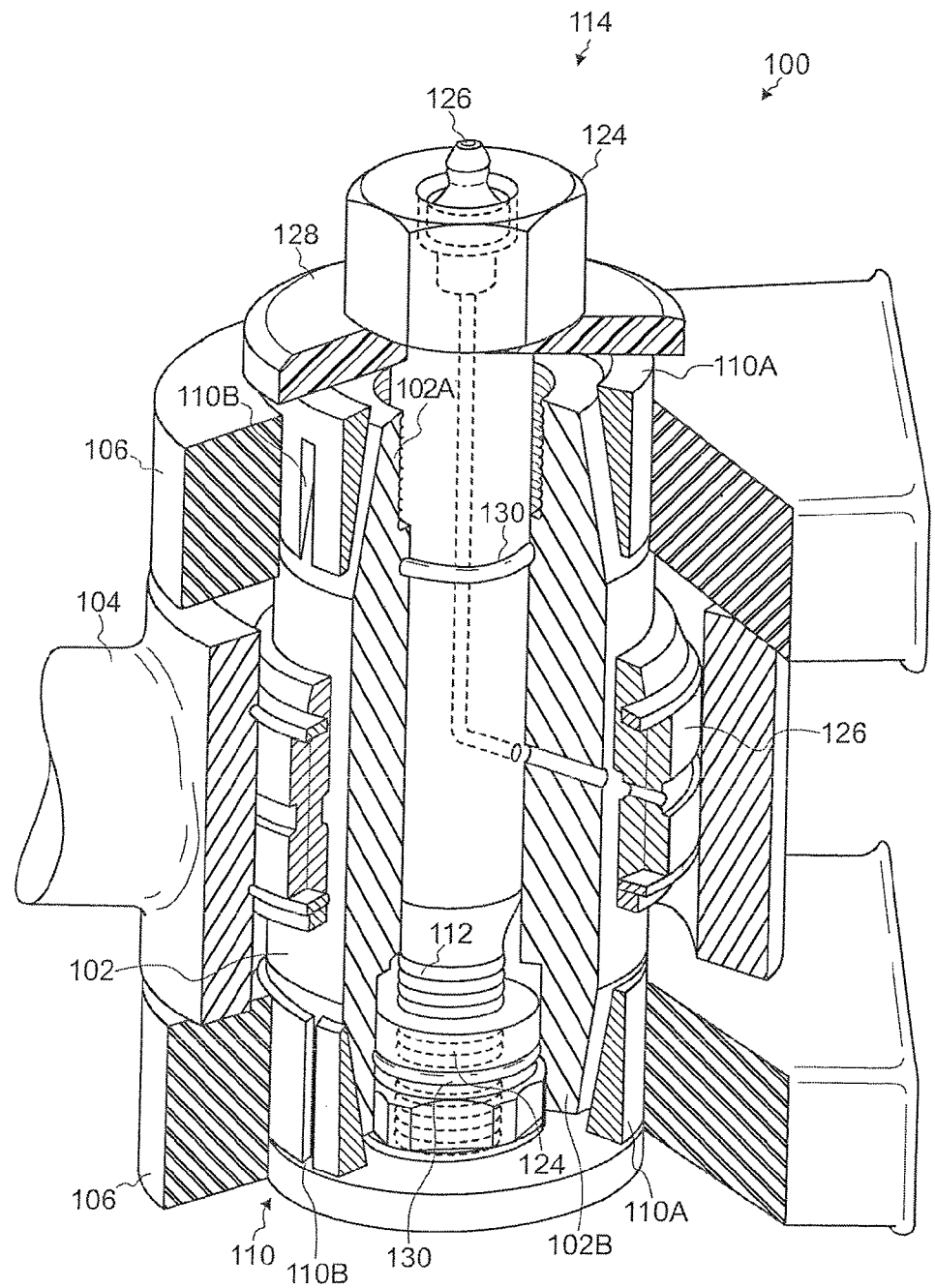
FIG. 1 is a perspective view of the bolt assembly used to connect two machine parts.
Figure 2:
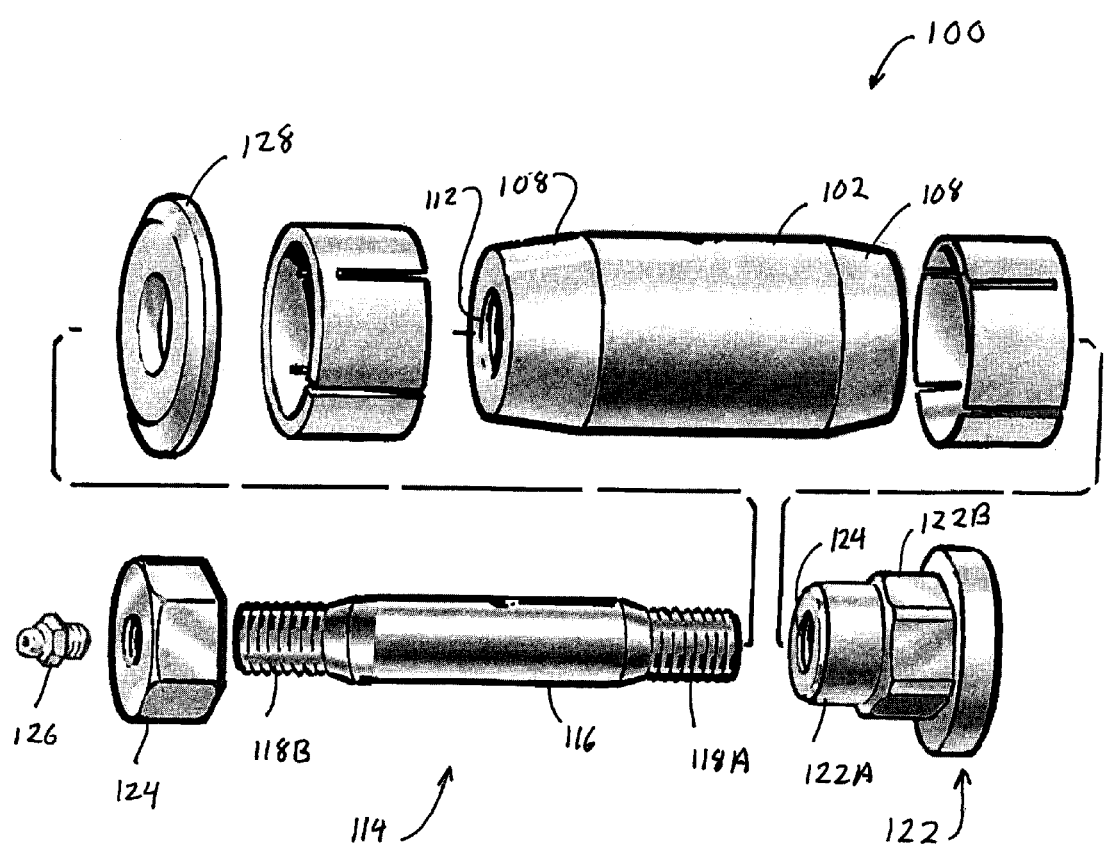
FIG. 2 is an exploded view of the bolt assembly; including an alternative type of through pin.
Figure 3A:
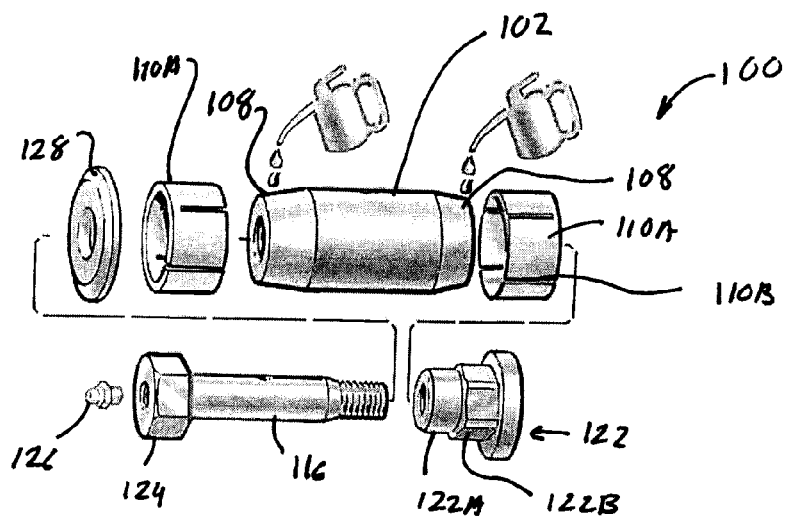
FIG. 3A-3C shows a method of installing the bolt assembly of the present invention.
Figure 3B:
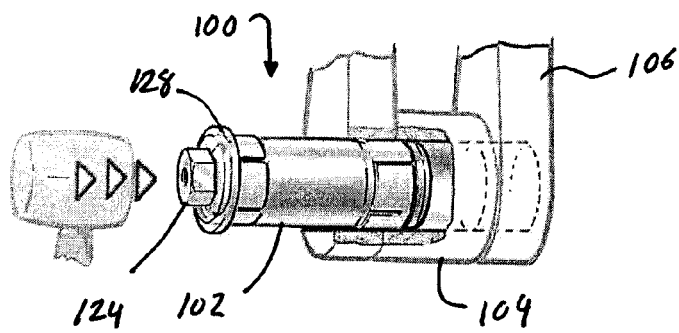
Figure 3C:
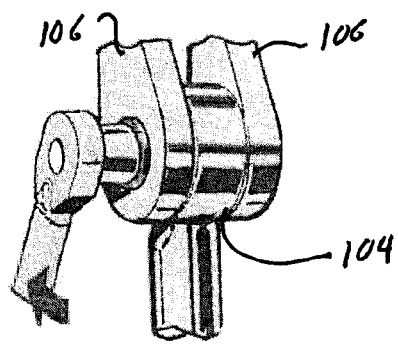

The present invention provides a through pin assembly 100 for locking a shaft or an axle 102 (hereinafter axle) into a pair of mounting cheeks 106 and a machine member 104 where solely one end of the axle 102 need be accessible in order to clamp or lock the through pin assembly 100 into a pair of mounting cheeks 106 and to stabilize the machine member 104. Referring to FIGS. 1 and 2, the through pin assembly 100 is shown. The through pin assembly 100 is used to lock the axle 102 into a pair of mounting cheeks 106 and to stabilize a machine member 104. In the embodiment shown in FIGS. 1 and 2, the through pin assembly 100 is connecting and locking into the two mounting lugs 106 and the machine member 104.

The through pin assembly 100 will have an axle 102. A pair of end members 108 is formed on each end of the axle 102. In the embodiment shown in FIGS. 1 and 2, the end members 108 are tapered so that the distal end of the end members 108 is narrower than the proximal end. However, this is just shown as an example. The end members 108 may be cylindrical in shape as will be discussed below. A channel 112 is formed in the axle 102. The channel 112 runs a length of the axle 102. Located on a central cylindrical part of the axle 102 is an inner race of a bearing 126. The bearing 126 may be press fitted or the like.

In the embodiment depicted in FIGS. 1 and 2, a pair of expansion sleeves 110 is provided. Each expansion sleeve 110 has a housing 110A. In accordance with one embodiment of the present invention, the housing 110A is cylindrical in shape while the end member 108 of the through pin assembly 100 is conical. However, in accordance with another embodiment of the present invention, the housing 110A is conical in shape while the end member 108 of the through pin assembly 100 is cylindrical.

Each housing 110A is hollow and has a pair of open ends. A plurality of slots 110B is formed in the housing 110A and goes through the housing 110A into the hollow section of the housing 110A. The slots 110B generally run along a length of the housing 110A. At least one of the pluralities of slots 110B will run an entire length of the housing 110A. The slots 110B act as annular wedges, with the apex pointing towards the central section of the axle 102. The number of slots 110B formed in the housing 110A is based on the diameter of the housing 110A. The larger the diameter of the housing 110A the more slots 110B are generally needed. In general, four to six slots 110B are formed in each housing 110A. The slots 110B will run vertically down the side of the housing 110. One slot 110B may run the length of the housing 110. The housing 110 is generally made of a sturdy metallic material. In accordance with one embodiment of the present invention, a treated yellow chrome oxide is used to cover the housing 110.

The expansion sleeves 110 are used for anchoring of the axle 102 in the respective mounting cheeks 106. This is accomplished by causing the respective expansion sleeves 110 to expand over the end members 108 of the axle 102 by means of a locking device 114. The locking device 114 applies, via the tension washer 128, pressure on the expansion sleeves 110. The slots 110B in the expansion sleeves 110 allow the expansion sleeves 110 to expand and press against the interior walls of the mounting cheeks 106. The locking device 114 will secure the axle 102 into mounting cheeks 106 and stabilize the machine member 104 and only requires one end of the axle 102 to be accessible in order to secure the axle 102 into mounting cheeks 106 and stabilizing the machine member 104.

The locking device 114 has a pin 116. One end of the pin 116 will have threads 118A. The other end of the pin 116 is screw-threaded 118B and carries a tensioning nut 124 and a grease nipple 126. When inserted into the channel 112, the pin 116 will extend coaxially through the channel 112 of the axle 102.

A locking end member 122 is secured to the end of the pin 116 having threads 118A. The locking end member 122 is threaded in the central area 124 and consists of a cylindrical head member 122A and a hexagon, octagon or otherwise shaped member 122B to form a mushroom-headed end member 122. The threads 118 of the pin 116 will engage the threaded channel 124 formed in the locking end member 122. The hexagon, octagon or otherwise shaped part 122B of the locking end member 122 interlocks with the hexagon, octagon or otherwise shaped part 124 of the axle 102, to ensure that the locking end member 122 is not rotating during installation or removal. The locking end member 122 is also used to apply pressure to one of the pair of expansion sleeves 110 in order to cause the expansion sleeves 110 to expand and press against the interior walls of the mounting cheeks 106.

A tension washer member 128 may also be provided. The tension washer member 128 has an opening formed through a central area thereof through which the pin 116 is inserted. The tension washer member 128 is positioned so that a smooth side of the tension washer member 128 faces towards the expansion sleeve 110 as will be discussed below. The tension washer member 128 is used to apply pressure to one of the pair of expansion sleeves 110 in order to cause the expansion sleeves 110 to expand and press against the interior walls of the mounting cheeks 106. The tension washer member 128 is designed in a strong metal with properties allowing a static tension to be built up, and kept, between the head of the pin 116 and the threads 124 inside the locking end member 122.

In operation, the axle 102 is locked into the interior walls of the mounting cheeks 106 in the following manner. The locking end member 122 is secured to the through pin 116. This is done by having the threads 118A of the through pin 116 engage the threaded channel 124 formed in the cylindrical head member 122A and the hexagon, octagon or otherwise shaped part 122B of the locking end member 122. One of the expansion sleeves 110 is fitted onto the second end 102B of the axle 102. The pin 116 is then inserted into the channel 112 formed in the axle 102 with two grooves 130 in the channel, one at each end, as a seat for o-rings to seal off a grease or oil chamber 132 for distribution to the bearing. The second of the pair of expansion sleeves 110 is then fitted onto the first end 102A of the axle 102. The tension washer member 128 is then fitted onto the pin 116 and the tensioning nut 124 is screwed onto the pin 116 and into abutment with the tension washer member 128. When tightening of the tensioning nut 124 is continued, the force generated thereby will cause the expansion sleeves 110 to expand so as to be pressed into the two mounting cheeks 106 stabilizing the machine member 104 and therewith locking the axle 102 to the mounting cheeks 106. The grease nipple 126 is then screwed into the tensioning nut 124.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A through pin assembly for securing an axle to a pair of mounting cheeks and stabilizing a machine member comprising:

an axle having a tapered first end and a tapered second end, a channel formed through the axle and running a length of the axle;

a bearing mounted on a central section of the axle;

a pair of expansion sleeves, wherein one of the pair of expansion sleeves is positioned over each of the first end and second end of the axle;

a locking device inserted into the channel, wherein the locking device comprises:

a through pin having a first and second end that are externally threaded;

a first locking member which engages threads on the first end of the through pin; a tension washer member having an opening formed through a central area thereof through which the through pin in inserted, the tension washer member engaging the first locking member and the expansion sleeve on the first end of the axle and causing the expansion sleeves to expand to secure the axle when the first locking device is theadably adjusted along the first end of the through pin; and a second locking member, the second locking member comprising:

a cylindrical head member, the cylindrical head member having a threaded central section which engages threads on the second end of the through pin;

a geometric shaped member attached to the cylindrical head member, the geometric shaped member interlocking with a geometric shaped opening in the channel in the second end of the axle to prevent the second locking member from rotating during one of installation or removal; and a flanged head member engaging the expansion sleeve on the second end of the axle and causing the expansion sleeves to expand to secure the axle when the first locking device is theadably adjusted along the first end of the through pin;

wherein the expansion sleeves on the first end and the second end of the axle expand into a pair of mounting cheeks to secure the axle when the first locking device is adjusted.

2. A through pin assembly for securing an axle to a pair of mounting cheeks and stabilizing a machine member in accordance with claim 1 wherein the axle having a first end and a second end, a channel formed through the axle and running a length of the axle has an annular groove formed in each end of the channel as a seat for a gasket to seal off a lubrication chamber for distribution to the bearing.

3. A through pin assembly for securing an axle into a pair of mounting cheeks and stabilizing a machine member in accordance with claim 2 wherein each of the pair of expansion sleeves is cylindrical in shape.

4. A through pin assembly for securing an axle into a pair of mounting cheeks and stabilizing a machine member in accordance with claim 1 wherein the washer member is positioned so that a smooth side of the washer member faces towards the expansion sleeve on the first end of the axle.

5. A through pin assembly for securing an axle into a pair of mounting cheeks and stabilizing a machine member in accordance with claim 1 further comprising a grease nipple rotatably coupled to the tension device.

6. A through pin assembly for securing an axle into a pair of mounting cheeks and stabilizing a machine member comprising:

a bearing mounted on a central section of an axle;

the axle having a tapered first end and a tapered second end, a channel formed through the axle and running a length of the axle and having an annular groove formed at each end of the channel as a seat for a seal device to seal a chamber for distribution of a lubricant to the bearing;

a pair of expansion sleeves, wherein one of the pair of expansion sleeves is positioned over each of the first end and second end of the axle;

a locking device inserted into the channel, wherein the locking device comprises:

a through pin having a first end and second end that is externally threaded;

a tension device threaded on the first end of the pin and engages the expansion sleeve on the first end of the axle;

a tension washer member having an opening formed through a central area thereof through which the through pin is inserted, the tension washer member engaging the tension device and the expansion sleeve on the first end of the axle and causing the expansion sleeves to expand to secure the axle when the tension device is theadably adjusted along the first end of the through pin; and a second locking member, the second locking member comprising:

a cylindrical head member, the cylindrical head member having a threaded central section which engages threads on the second end of the through pin;

a geometric shaped member attached to the cylindrical head member, the geometric shaped member interlocking with a geometric shaped opening in the channel in the second end of the axle to prevent the second locking member from rotating during one of installation or removal; and a flanged head member engaging the expansion sleeve on the second end of the axle and causing the expansion sleeves to expand to secure the axle when the tension device is theadably adjusted along the first end of the through pin;

wherein the expansion sleeves on the first end and the second end of the axle expand into the mounting cheeks to stabilize the machine member and to secure the axle when the tension device is adjusted.

7. A through pin assembly for securing an axle into a pair of mounting cheeks and stabilizing a machine member in accordance with claim 6 wherein the washer member is positioned so that a smooth side of the washer member faces towards the expansion sleeve on the first end of the axle.

8. A through pin assembly for securing an axle into a pair of mounting cheeks and stabilizing a machine member in accordance with claim 6 further comprising a grease nipple rotatably coupled to the tension device.

9. A method of installing a through pin assembly for securing an axle into a pair of mounting cheeks and stabilizing a machine member comprising:

providing a through pin assembly comprising:

a bearing mounted on a central section of an axle;

an axle having a tapered first end and a tapered second end, a channel formed through the axle and running a length of the axle and having an annular groove formed at each end of the channel as a seat for a seal device to seal a chamber for distribution of a lubricant to the bearing;

a pair of expansion sleeves, wherein one of the pair of expansion sleeves is positioned over each of the first end and second end of the axle;

a locking device inserted into the channel, wherein the locking device comprises:

a through pin having a first end and second end that is externally threaded;

a tension device threaded on the first end of the pin and engages the expansion sleeve on the first end of the axle;

a tension washer member having an opening formed through a central area thereof through which the through pin is inserted, the tension washer member engaging the tension device and the expansion sleeve on the first end of the axle and causing the expansion sleeves to expand to secure the axle when the tension device is theadably adjusted along the first end of the through pin; and a locking end member which is threaded on the second end of the through pin and engages the expansion sleeve on the second end of the axle, the locking end member comprising:

a cylindrical head member, the cylindrical head member having a threaded central section which engages threads on the second end of the through pin;

a geometric shaped member attached to the cylindrical head member, the geometric shaped member interlocking with a geometric shaped opening in the channel in the second end of the axle to prevent the locking end member from rotating during one of installation or removal; and a flanged head member engaging the expansion sleeve on the second end of the axle and causing the expansion sleeves to expand to secure the axle when the tension device is theadably adjusted along the first end of the through pin;

securing the locking end member to the second end of the pin;

fitting one of the pair of expansion sleeves onto the second end of the axle;

inserting the pin into the channel formed in the axle;

fitting one of the pair of expansion sleeves onto a first end of the axle;

fitting the tension washer member onto the first end of the pin; and securing the tensioning device onto the first end of the pin and abutted with the tension washer member, wherein tightening the tensioning device causes the tension washer member and the locking end member to engage the expansion sleeves causing the expansion sleeves to expand and be pressed into a pair of mounting cheeks and securing the machine member.

* * * * *